US008483945B2

(12) United States Patent
Herink

(10) Patent No.: US 8,483,945 B2
(45) Date of Patent: Jul. 9, 2013

(54) METHOD FOR REDUCING THE ENERGY ABSORBED BY A VEHICLE IN A COLLISION AND A SYSTEM FOR IMPLEMENTING THE METHOD

(76) Inventor: Richie Herink, Ridgewood, NJ (US)

(\*) Notice: Subject to any disclaimer, the term of this patent is extended or adjusted under 35 U.S.C. 154(b) by 164 days.

(21) Appl. No.: 13/220,195

(22) Filed: Aug. 29, 2011

(65) Prior Publication Data

US 2013/0054103 A1    Feb. 28, 2013

(51) Int. Cl.
| | | |
|---|---|---|
| G05D 3/00 | (2006.01) | |
| G06G 7/76 | (2006.01) | |
| G06G 7/78 | (2006.01) | |
| B60T 7/12 | (2006.01) | |
| B60T 7/22 | (2006.01) | |
| G08G 1/16 | (2006.01) | |
| B60W 10/00 | (2006.01) | |
| B60W 10/18 | (2006.01) | |
| B60L 3/00 | (2006.01) | |
| B60K 28/10 | (2006.01) | |
| B60K 28/14 | (2006.01) | |

(52) U.S. Cl.
USPC .............. 701/302; 701/45; 701/65; 701/70; 701/78; 701/79; 701/300; 701/301; 477/40; 477/182; 180/232; 180/271; 180/274; 180/275

(58) Field of Classification Search
USPC ............ 701/41, 45, 65, 70, 78, 79, 300, 301, 701/302; 477/40, 182; 180/232, 271, 274, 180/275, 277, 279; 340/435, 436
See application file for complete search history.

(56) References Cited

U.S. PATENT DOCUMENTS

| 3,899,935 A | 8/1975 | Jiles ........................ 74/473.11 |
| 5,452,775 A | 9/1995 | Bussinger ................... 188/2 F |
| 6,012,008 A | 1/2000 | Scully ........................... 701/45 |
| 6,699,155 B2 | 3/2004 | Nagasaka ...................... 477/94 |

(Continued)

FOREIGN PATENT DOCUMENTS

| CN | 2478874 Y | 2/2002 |
| CN | 1966319 | 5/2007 |

(Continued)

OTHER PUBLICATIONS

Notification of Transmittal of the International Search Report and the Written Opinion of the International Searching Authority, or the Declaration mailed Sep. 7, 2012.

*Primary Examiner* — Khoi Tran
*Assistant Examiner* — Robert Nguyen
(74) *Attorney, Agent, or Firm* — Ostrolenk Faber LLP

(57) ABSTRACT

A system for a vehicle that executes a method to reduce the energy absorbed by the vehicle due to a collision, the method including actively decelerating the vehicle when it is determined that a collision with an object is possible, terminating active deceleration to allow the vehicle to move forward when it is determined that a collision with the object is inevitable just before the collision, and allowing the vehicle to make contact with the object and move generally in an opposite direction after the vehicle makes contact with the object.

19 Claims, 7 Drawing Sheets

U.S. PATENT DOCUMENTS

| | | | |
|---|---|---|---|
| 6,793,034 B2 | 9/2004 | Raftari | 180/285 |
| 6,842,684 B1 | 1/2005 | Kade et al. | 701/70 |
| 6,856,906 B2 | 2/2005 | Winner et al. | 701/301 |
| 7,035,735 B2 | 4/2006 | Knoop et al. | 701/301 |
| 7,375,620 B2 | 5/2008 | Balbale | 340/435 |
| 7,866,427 B2 | 1/2011 | Zagorski | 180/167 |
| 2008/0183360 A1 | 7/2008 | Zhang et al. | 701/70 |
| 2009/0038873 A1* | 2/2009 | Lucas et al. | 180/275 |
| 2010/0235029 A1 | 9/2010 | Becker et al. | 701/22 |

FOREIGN PATENT DOCUMENTS

| | | |
|---|---|---|
| CN | 201009871 Y | 1/2008 |
| DE | 102007025144 | 2/2008 |
| JP | 04638317 B2 | 2/2011 |

\* cited by examiner

METHOD FOR REDUCING THE ENERGY ABSORBED BY A VEHICLE IN A COLLISION AND A SYSTEM FOR IMPLEMENTING THE METHOD

FIELD OF THE INVENTION

The present invention relates to a method for reducing the energy absorbed by a vehicle in a collision and a system for implementing the method.

BACKGROUND OF THE INVENTION

According to the Centers for Disease Control, traffic accidents cost the United States over $99 Billion annually with more than 2 million people being injured in more than 5.5 million crashes. This includes the nearly 40,000 people who die from crash-related injuries. The additional monetary cost of the related damage to the vehicles and property involved is unknown.

Vehicular collisions include:
1) the front-impact collision, which involves two vehicles colliding head-on or a vehicle crashing directly into a barrier such as a telephone pole;
2) the offset crash in which only part of the front of a vehicle impacts with another vehicle or a barrier;
3) the side-impact crash wherein a vehicle crashes into the side of another vehicle;
4) the rear-end collision wherein a vehicle crashes into the back of another vehicle;
5) collision with a pedestrian.

A pre-crash system has been defined in Wikipedia as "an automobile (or other vehicle) system that is designed to reduce the severity of an accident. Most are known as forward collision warning systems that use radar and sometimes radar sensors to detect an imminent crash. Depending on the system used, they may warn the driver, pre charge the brakes, inflate the seat belts for extra support, move the passenger seat to a safer position, and fold up the rear head rest for whip lash, retract the seat belts removing excess slack and automatically apply partial or full braking to minimize the crash severity." Sensors can also be microwave, ultrasonic, laser and optical depending on the system used. The terms pre-crash system, collision avoidance system, pre-collision avoidance system, pre-collision system and forward collision warning system are often used interchangeably.

Because it is the kinetic energy of the forward moving vehicle that causes the damage in a collision, pre-crash systems rely on the vehicle's brakes to slow down or stop the vehicle in time to avoid the collision or at least to minimize its impact.

Not all pre-crash systems are alike. In Volkswagen's system, once the severity of collision is determined the vehicle's airbags are deployed and the system automatically unlocks all doors, disconnects the battery terminal from the alternator cable, shuts off the fuel supply and turns on the warning hazards and interior lights.

Audi's system works in four phases. Initially, it provides a warning of an impending accident, activates the hazard warning lights, closes the side windows and the sunroof, and tightens the front seat belts. The warning is followed by light braking which is strong enough to get the driver's attention. Then, autonomous braking is initiated at a rate of 3 m/s. Thereafter, the vehicle is decelerated at 5 m/s followed by deceleration at full braking power, roughly half a second before impact. To lessen the adverse consequences of a rear end collision, the windows and the sunroof are closed, the seat belts are prepared for impact and the optional memory seats are moved forward to protect the occupants of the vehicle.

Ford's system provides a warning through a heads-up display and if the driver does not react, the system precharges the brakes and increases the brake assist sensitivity to maximize the driver's braking performance.

In Honda's system a radar based system monitors the situation ahead and provides automatic braking if the driver does not react to both a warning displayed in the instrument panel and a tightening of the seat belts. Honda has also developed a night vision system, which highlights pedestrians in front of the vehicle by alerting the driver with an audible chime and a visual warning.

Nissan offers a laser-based system, which pre-pressures the braking system so maximum force can be applied early.

Toyota offers a radar based system which preemptively tightens the seat belts to remove any slack and pre-charges the brakes using brake assist to give the driver maximum stopping power when the driver depresses the brake pedal when the system determines that a frontal collision is unavoidable.

The Lexus division of Toyota offers a rearward facing millimeter-wave radar mounted in the rear bumper which adjusts the active head restraints by moving them upward and forward to avoid the risk of whip lash injuries if an imminent rear collision is detected.

The known pre-crash systems are focused on accident avoidance through the use of the vehicle's brakes while protecting the vehicle's occupants. However, these systems do not address what happens when the vehicle is unable to stop in time and a collision is about to occur.

Many vehicles have been designed to include a crumple zone. The crumple zone is that part of the vehicle intentionally designed to deform during a collision in order to absorb the kinetic energy of the vehicle. Naturally, a crumple zone by design sacrifices a significant portion of the vehicle to protect the occupants of the vehicle.

To summarize, the pre-crash systems that are currently known can vary in complexity and function from the relatively straight-forward vision-based crash avoidance technology, which helps prevent collisions by applying the brakes in the event of an impending front end collision, to a technically complex radar-based system which monitors the traffic situation ahead and initially provides automatic partial braking and then provides a maximum braking force seconds before an impact occurs. These pre-crash systems all involve applying the brakes to stop the vehicle, if possible, to prevent a collision with an object. If a pre-crash system is not able to stop the vehicle in time to prevent a collision, the crumple zones of one or both vehicles in a collision are designed to absorb the kinetic energy of the colliding vehicle and thereby protect the occupants from being injured. Thus, when a collision is unavoidable, both vehicles will likely suffer severe damage in the process of absorbing the kinetic energy of the forward moving vehicle.

SUMMARY OF THE INVENTION

An object of the present invention is to alter the negative dynamics of a collision by facilitating the redirection of the kinetic energy of a forward moving vehicle generally in the reverse or opposite direction. Consequently, the vehicle and its passengers absorb less energy.

A method according to the present invention employs the kinetic energy of a forward moving vehicle to lessen the adverse effects of a collision. Unlike prior art methods, such as using a crumple zone designed to absorb the kinetic energy of a forward moving vehicle, a method according to the present invention works in combination with a conventional pre-crash system to redirect the kinetic energy of the vehicle generally in an opposite direction.

A method according to the present invention is particularly suited for smaller, lighter vehicles since such vehicles are more likely to bounce back after impact with an object. Moreover, smaller vehicles usually do not have sufficient space for a properly sized crumple zone that can be effective in a high-energy collision at a high speed. Although best suited for smaller vehicles, a method according to the present invention can be employed in vehicles of all sizes and types including military vehicles.

To redirect the kinetic energy of a forward moving vehicle, a method according to the present invention facilitates the recoil of the vehicle after collision. When a rubber ball is thrown hard against a solid wall it bounces back. The wall and the ball suffer little or no physical damage because the ball can bounce back. That is, the kinetic energy of the forward moving ball is redirected generally in the opposite direction after impact because there is no impediment to the motion of the ball generally in the opposite direction.

In a conventional pre-crash system the brakes are engaged before, throughout, and after the collision. Naturally, upon impact, a forwardly moving vehicle cannot move in the opposite direction because the brakes are engaged. On the other hand, given a short enough distance between the forward moving vehicle and an object with which it will collide the engagement of the brakes does not provide enough deceleration to avoid substantial damage to the vehicle. However, if a forward moving vehicle with disengaged brakes and in a neutral gear hits a solid wall the vehicle can bounce back because there will be no resistance to its motion in generally the reverse or opposite direction.

Generally in the opposite direction means that there is a component or vector in the opposite direction. As most collisions will not be between two vehicles moving in precisely the same direction, so the reaction force of a collision will be at an angle to the collision force. The same applies to any contact that is angled to the forward direction of motion of the vehicle at impact. The angle of incidence of the collision will determine the angle of reflection or reverse motion of the vehicle. The energy of the forward moving vehicle is, in effect, redirected to propel the vehicle away from the wall. A sturdy front bumper can further facilitate the reversal of momentum that redirects the vehicle generally in the reverse or opposite direction. Facilitating the reversal of the direction of the vehicle after impact is the basic concept underlying a method according to the present invention.

A method for reducing the energy absorbed by a vehicle in a collision according to the present invention includes actively decelerating the vehicle that is moving at a speed in a forward direction based on a determination that a collision with an object is possible if the vehicle continues to move in a forward direction at the speed; determining whether a collision with the object is inevitable; and terminating the active deceleration step shortly before the vehicle reaches the object to allow the vehicle to make contact with the object and for a short time after collision. During the time after terminating deceleration the vehicle may decelerate naturally while moving in the forward direction. It can be determined that the collision is inevitable based on the vehicle's speed and rate of deceleration, the vehicle's distance to the object, and the velocity of the object relative to the velocity of the vehicle, i.e. the speed difference. The active deceleration may be terminated at a distance between the vehicle and the object that is calculated based on the deceleration of the vehicle at an instant in time, distance between the vehicle and the object at the instant in time, the velocity of the object at the instant in time and the amount of time required to effect terminating the active deceleration, e.g. how long is the time for the vehicle brakes to disengage. The time between the end of active deceleration and collision is preferably as short as possible to obtain the maximum achievable deceleration before impact. That time may be a small fraction of a second.

The method may further include automatically engaging the vehicle's brakes after the vehicle makes contact with the object and begins recoil to move generally in a reverse direction, the reverse direction including at least a component of motion opposite the forward direction.

The vehicle may be actively decelerated by engaging the vehicle's brakes, shifting the vehicle's transmission into a lower gear, or engaging the vehicle's brakes and shifting the vehicle's transmission into a lower gear.

In one embodiment the method includes determining whether it is possible to shift the vehicle's transmission into a reverse gear before terminating the actively decelerating step or as part of the active deceleration.

According to the present invention, a vehicle is provided with a system that includes a sensor system and a processor that includes a programmable computer in communication with the sensor system. The sensor system provides information to the programmable computer about objects outside the vehicle, and the programmable computer is configured (i.e. programmed) to perform a method to reduce the energy absorbed by the vehicle due to a collision based on information provided by the sensor system. The method performed by the processor includes actively decelerating the vehicle that is moving at a speed in a forward direction based on a determination that a collision with an object is possible if the vehicle continues to move in a forward direction at the speed; determining whether a collision with the object is inevitable; and terminating the actively decelerating step a selected period of time before the vehicle reaches the object which can allow the vehicle to decelerate naturally while moving in the forward direction. It can be determined that collision is inevitable based on the vehicle's deceleration, the vehicle's distance to the object, and the velocity of the object relative to the velocity of the vehicle. Active deceleration may be terminated at a distance between the vehicle and the object that is calculated by the processor based on the deceleration of the vehicle at an instant in time, distance between the vehicle and the object at the instant in time, the velocity of the object relative to that of the vehicle at the instant in time and an amount of time required to effect terminating the active deceleration.

The method performed by the programmable computer may further include issuing instruction to engage the vehicle's brakes after the vehicle makes contact with the object and recoils to move in a generally reverse direction opposite the forward direction. The system would sense contact by sensing the resulting deceleration.

The vehicle may be actively decelerated by engaging the vehicle's brakes, shifting the vehicle's transmission into a lower gear or possibly a reverse gear, or else by engaging the vehicle's brakes and shifting the vehicle's transmission into a lower gear.

In one embodiment, the method performed by the programmable computer includes determining whether it is possible to shift the vehicle's transmission into a reverse gear before terminating the actively decelerating step, and then issuing instructions to shift into the reverse gear if it is determined that shifting into reverse is possible.

According to one embodiment, the programmable computer is further programmed to receive information from the sensor system regarding an object approaching from a rear of the vehicle, and to issue instructions to shift the vehicle's transmission into neutral shortly before the rear approaching object makes contact with the vehicle. In effect, the rear approaching vehicle is like an object, such as another vehicle, which is moving toward the vehicle having the system hereof, which is determined to presage a collision.

Other features and advantages of the present invention will become apparent from the following description of the invention which refers to the accompanying drawings.

DETAILED DESCRIPTION OF EMBODIMENTS OF THE INVENTION

Figure 1A:
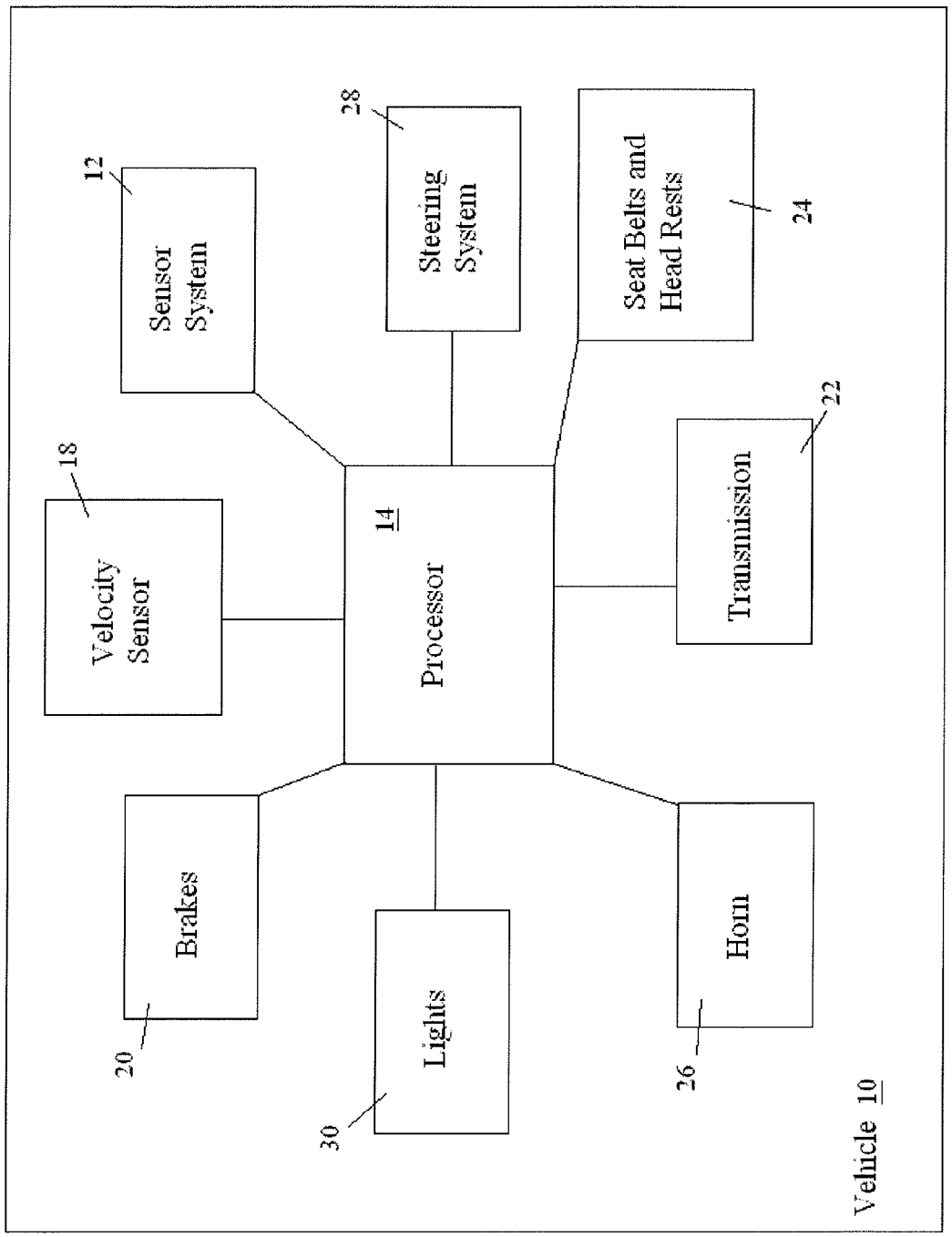
FIG. 1A schematically illustrates a vehicle having a system that performs a method according to the present invention.
Figure 1B:
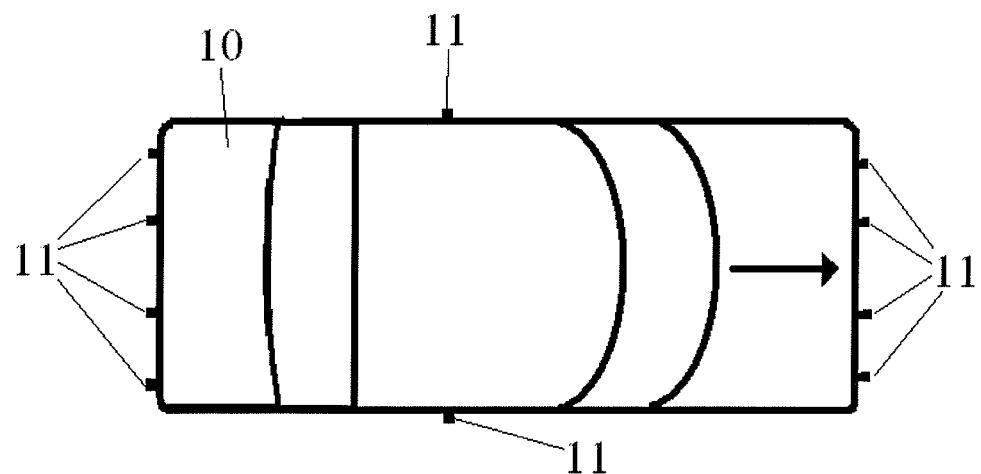
FIG. 1B illustrates a top plan view of a vehicle and the relative positioning of the sensors of its sensor system.
Figure 1C:
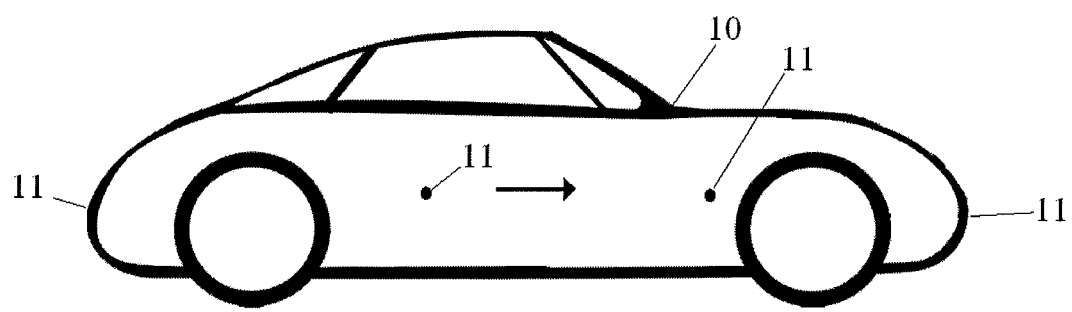
FIG. 1C illustrates a side plan view of the vehicle illustrated in FIG. 1B.

Referring to FIG. 1, a vehicle 10 having a system that performs a method according to the present invention may include one sensor or a plurality of sensors (hereafter sensor system 12) to gather information based on which a conventional pre-crash system determines whether a collision with an object is possible. Sensor system 12 may be located on vehicle 10 according to any known arrangement. Sensor system 12 may include a plurality of sensors 11. For example, as illustrated in FIGS. 1B and 1C, sensors 11 may be provided for the front of the vehicle 10 for sensing obstacles in front and optionally sensors 11 at the rear for sensing an obstacle there. Sensors 11 may also be arranged on the sides of vehicle 10. Sensors 11 may be mounted behind the front and rear bumpers and the sides of vehicle 10 at the height of the bumpers. The information gathered by sensor system 12 is received by the vehicle's on-board processor 14, which includes a programmable computer that is programmed to perform the steps in a method according to the present invention as described below.

In an initial phase (referred to herein as the active deceleration phase), the system actively decelerates the vehicle once it determines that a collision with an object 16 is possible. Active deceleration as used herein means reducing the speed of vehicle 10 by any means other than drag on the vehicle engine which is not being accelerated, natural deceleration occurring due to outside wind resistance, friction with the road and the like. For example, the system may shift the vehicle's transmission into neutral and apply the brakes to decelerate the vehicle and/or shift the transmission into a lower gear to actively decelerate the vehicle or even shift the transmission into a reverse gear.

Figure 2:
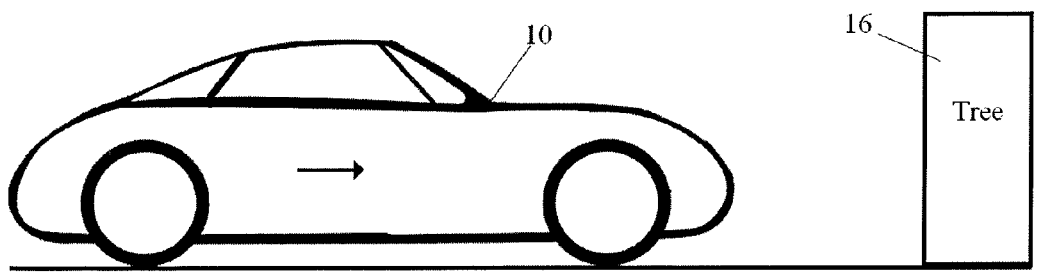
FIG. 2 illustrates a vehicle equipped with a system according to the present invention moving in a forward direction toward an object.

FIG. 2 illustrates vehicle 10 in forward motion approaching an object 16 (e.g. a tree). Active deceleration may be carried out once it has been determined that vehicle 10 is close enough to object 16 such that collision may be possible. Any known method may be employed to determine that a collision with object 16 is possible and the active deceleration may be carried out according to any known technique. Any one of the pre-crash systems discussed in the background section can be a suitable system for determining whether a crash is possible.

According to an aspect of the present invention, while actively decelerating the vehicle, the system continues to monitor object 16 through sensor system 12 in order to determine whether a collision is inevitable. To determine that collision is inevitable, processor 14 may be programmed to determine, at a given instant in time, whether vehicle 10 will make contact with object 16 despite active deceleration. Factors such as deceleration of vehicle 10 through the use of a velocity sensor 18 (which supplies information to the speedometer), the distance to object 16 measured based on information from sensor system 12, and the velocity of object 16 may be used to determine whether a collision is inevitable. Note that when object 16 is stationary, its velocity would be zero, while a moving object such as another vehicle would have a velocity. Deceleration may be determined by taking at least two velocity measurements at two different points in time and dividing the difference between two velocity values by the span of time between the two measurements. Alternatively, an accelerometer may be used to provide direct information to processor 14. The distance between vehicle 10 and object 16 can be measured directly by sensor system 12, while the velocity of object 16 can be determined by using the change in the distance between vehicle 10 and object 16 and the change in the velocity of vehicle 10 in a given span of time. It should be noted that the steps for determining whether collision is inevitable are repeatedly carried out until it is concluded that collision either is not or is inevitable.

Figure 3:
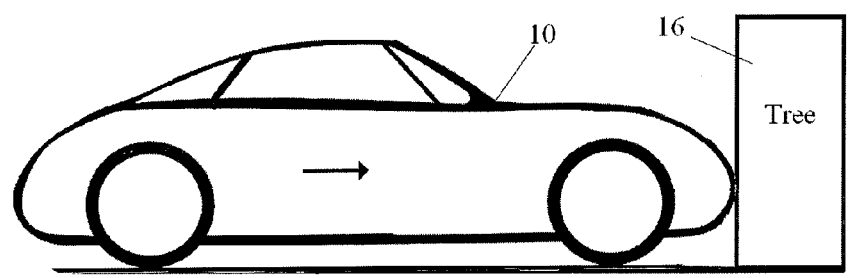
FIG. 3 illustrates a vehicle equipped with a system according to the present invention at the moment of contact with the object.

If during active deceleration the system determines that a collision is inevitable, then processor 14 issues instructions to disengage (i.e. release) brakes 20 and shift the transmission into neutral gear (if vehicle 10 is not in the neutral gear) before vehicle 10 makes contact with object 16 to allow vehicle 10 to make contact with object 16 while in neutral gear as illustrated by FIG. 3. That is, processor 14 terminates the active deceleration of vehicle 10. Active deceleration is terminated at a distance between vehicle 10 and object 16 that may be calculated based on the deceleration of vehicle 10 at an instant in time, distance between vehicle 10 and object 16 at that instant in time, the velocity of object 16 at that instant in time relative to the velocity of the vehicle and the amount of time required to effect the termination of active deceleration (e.g.

the amount of time required to disengage the brakes and shift into neutral if vehicle 10 is in a gear other than neutral). Preferably, active deceleration is terminated as close to object 16 as possible in order for the vehicle to make contact with object 16 at the lowest velocity possible. After termination of active deceleration, vehicle 10 will continue to move in the forward direction with slight natural deceleration (e.g. due to wind resistance; friction with the road, internal friction of the vehicle's transmission etc.)

Figure 4:
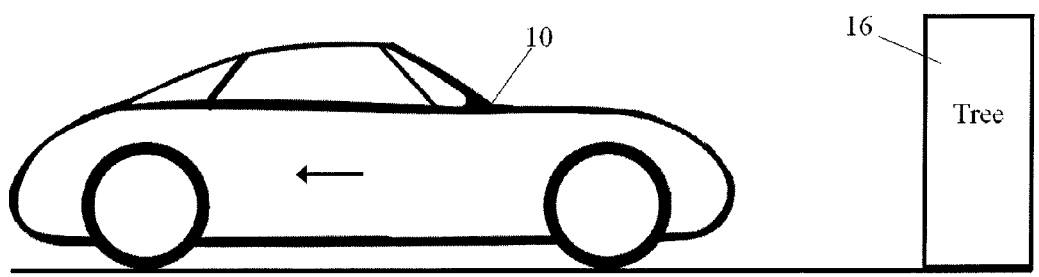
FIG. 4 illustrates a vehicle equipped with a system according to the present invention moving in a reverse direction (generally opposite to the forward direction) after making contact with the object.

According to another aspect of the present invention, processor 14 does not issue instructions to engage brakes 20 and does not issue instructions to shift gears from the neutral gear to any other gear until vehicle 10 makes contact with object 16 and possibly only after the vehicle begins to travel generally in the reverse direction as a result of the impact as illustrated by FIG. 4. Thereafter, processor 14 may send instructions to transmission 22 either to shift into the reverse gear or apply brakes 20 while vehicle 10 is moving generally in the reverse direction.

In an alternative embodiment, prior to shifting into a neutral gear, processor 14 could determine if it is safe for transmission 22 to be shifted into a reverse gear. If so, transmission 22 may be shifted into reverse instead of shifting transmission 22 into neutral. Optionally, processor 14 may issue instructions to engage brakes 20 when transmission 22 is shifted into reverse.

A system according to the present invention would carry out the same steps as those described above for a head-on collision, for a offset collision or for a side collision.

Figure 5:
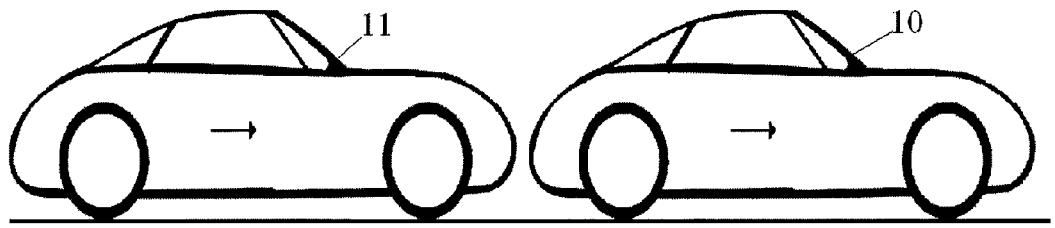
FIG. 5 illustrates a rear approaching vehicle at a distance from a vehicle equipped with a system according to the present invention.
Figure 6:
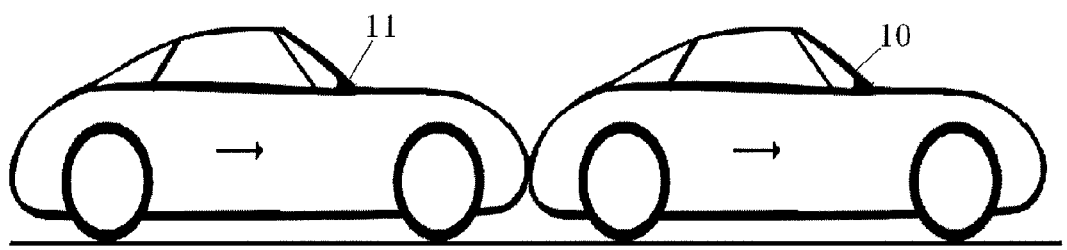
FIG. 6 illustrates the rear approaching vehicle in contact with a vehicle equipped with a system according to the present invention.
Figure 7:
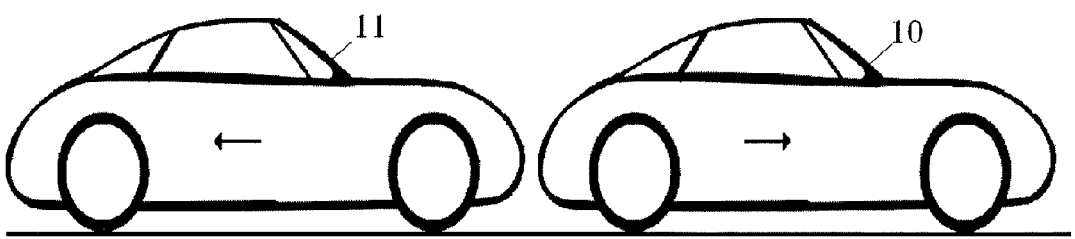
FIG. 7 illustrates a vehicle equipped with a system according to the present invention and the rear approaching vehicle after contact

According to another aspect of the present invention, the system may reduce damage due to a rear collision by allowing vehicle 10 to move forward after being hit from the rear. Specifically, referring to FIGS. 5, 6, and 7, when a system according to the present invention senses that vehicle 10 is about to be hit from rear by a moving object (e.g. vehicle 11) as illustrated in FIG. 5, processor 14 issues instructions to release brakes 20 and issues instructions to transmission 22 to shift into neutral gear. After the rear end contact is made as illustrated by FIG. 6, brakes 20 are strongly reapplied and vehicle 10 is shifted into a forward gear to stop the vehicle as soon as possible after collision. Consequently, a system according to the present invention allows vehicle 10 to be propelled forwardly with the kinetic energy received from the rear instead of the vehicle absorbing the energy of the rear impact. This is illustrated in FIG. 7. The velocity of both vehicles involved in the collision is decreased thereby reducing damage to the vehicles and injury to their occupants. Note that if both vehicles are equipped with a system that performs a method according to the present invention, then the vehicle receiving the rear impact will move forwardly while the vehicle delivering the rear impact moves in the reverse direction much like two billiard balls making contact with one another, as illustrated in FIG. 7. Consequently, the interaction of the two vehicles results in lowering the energy of collision absorbed by both vehicles. Preferably, prior to contact from the rear, processor 14 in the front vehicle issues instructions to adjust seat belts and head rests 24 to further reduce the possibility of injury to the occupants of the car. This same process performed by the processor may be followed in case of contact toward the front of the vehicle.

When the vehicle's sensor system 12 recognizes that a pedestrian in the front of vehicle 10 is going to be hit, processor 14 issues instructions to engage brakes 20 and issues instructions to transmission 22 to shift into reverse while at the same time sounding horn 26 or flashing headlights 30. If shifting into reverse is not possible, processor 14 issues instructions to steering system 28 to turn vehicle 10 in a direction that would avoid the pedestrian. A suitable system for determining that a pedestrian is in front of vehicle 10 is the SAVE-U system proposed by Volkswagen. The SAVE-U system is disclosed in detail in SAVE-U: First Experiences with a Pre-crash System for Enhancing Pedestrian Safety, Meinecke et al., the entire contents of which is incorporated by reference.

Figure 8:
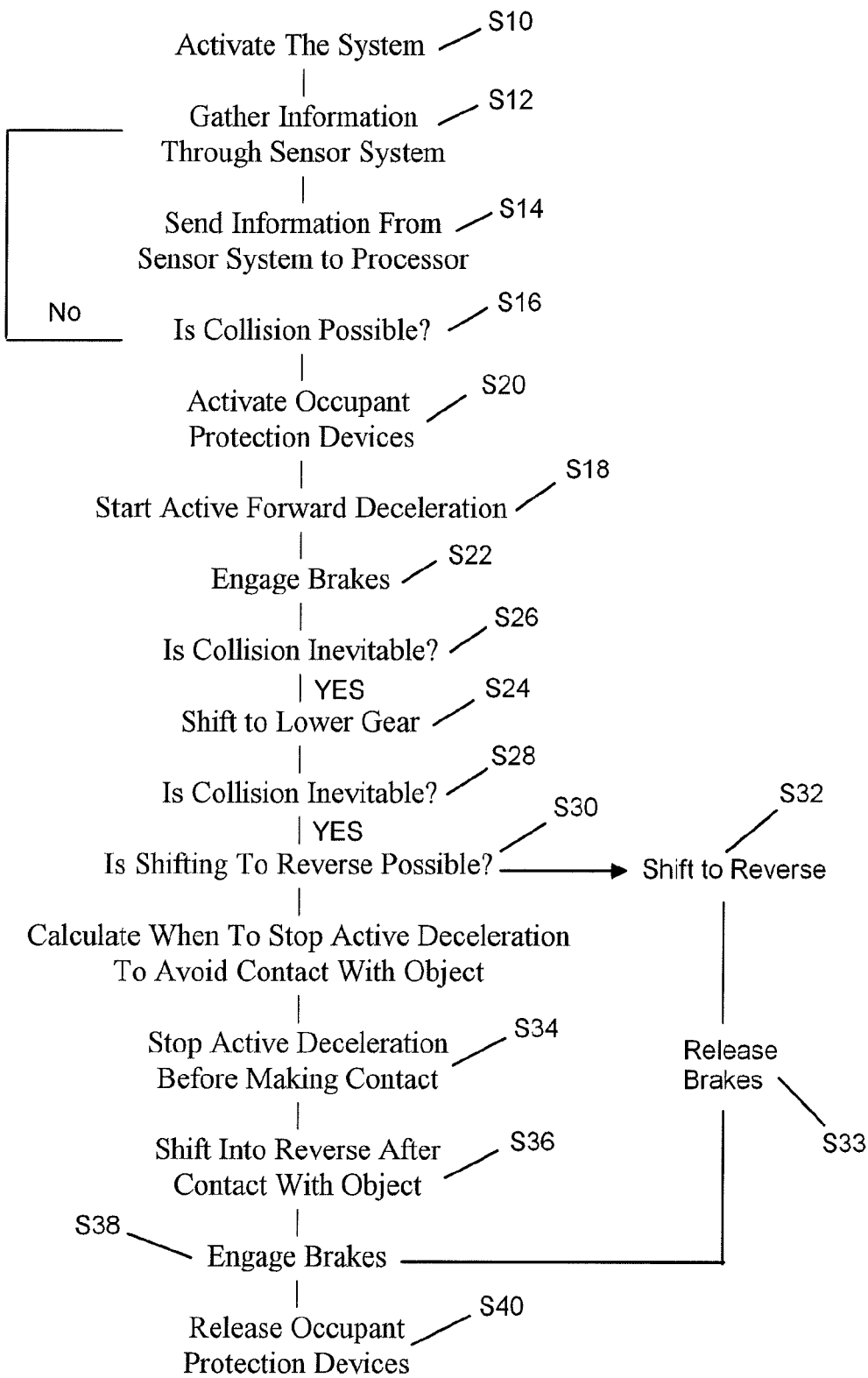
FIG. 8 shows the steps in a method according to a preferred embodiment of the present invention.
Figure 10:
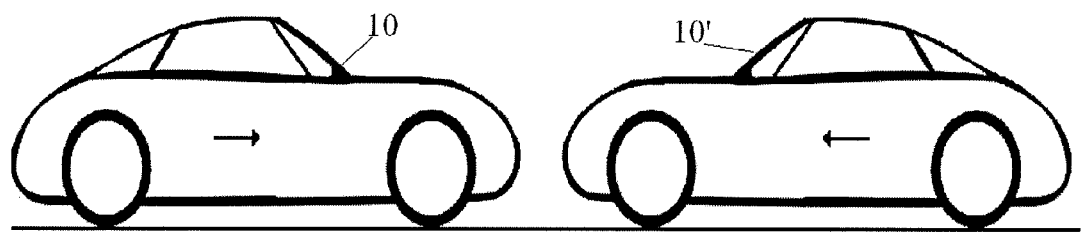
FIG. 10 illustrates a car equipped with a system according to the present invention and another vehicle approaching one another.
Figure 11:
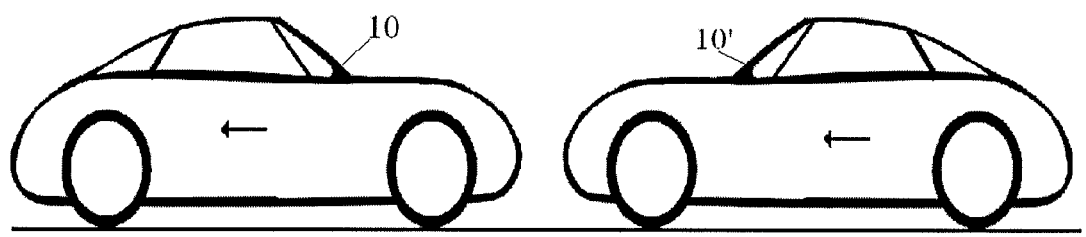
FIG. 11 illustrates the car equipped with a system according to the present invention as illustrated in FIG. 10 moving in an opposite direction according to an aspect of the present invention.

Referring to FIG. 8, a method according to the present invention includes activating the system (S10), gathering information through sensor system 12 (S12), sending information from sensor system 12 to processor 14 (S14), and determining whether a collision is possible (S16). If collision is not possible, sensor system 12 continues to gather and send information to processor 14. If it is determined that a collision is possible, active deceleration (S18) is applied. Optionally, occupant protection devices such as the seat belts and the headrests are adjusted (S20) to reduce the likelihood of injury to the occupant as described above. Active deceleration may include one or a combination of engaging brakes 20 (S22) and shifting into a lower gear (S24). Note that in the preferred embodiment, after engaging brakes (S22), it may be determined if collision is inevitable (S26) before shifting to a lower gear (S24). If it is determined that collision is still inevitable (S28), then, preferably, it is determined if the vehicle's speed is low enough to allow shifting into the reverse gear (S30). If so, transmission is shifted into the reverse gear (S32), brakes are released (S33) until the vehicle reaches a suitable speed to avert collision, and then brakes are engaged (S38) to stop the vehicle. If not, then active deceleration is terminated before vehicle 10 makes contact with object 16 (S34). To stop active deceleration, brakes are disengaged and transmission is shifted into a neutral gear if it is not in neutral gear. After vehicle 10 makes contact with object 16 and recoils, transmission 22 may be shifted into reverse (S36) and brakes 20 may be engaged (S38). Occupant protection devices (e.g. seatbelts) may be then released (S40). Referring to FIGS. 10 and 11, transmission of a vehicle 10 may be shifted into reverse if vehicle 10 is close to a rear collision with another vehicle 10' or prior to a potential head on collision as illustrated. By shifting into reverse, further space is provided between vehicles 10, 10', which may allow vehicle 10' more time to stop.

Figure 9:
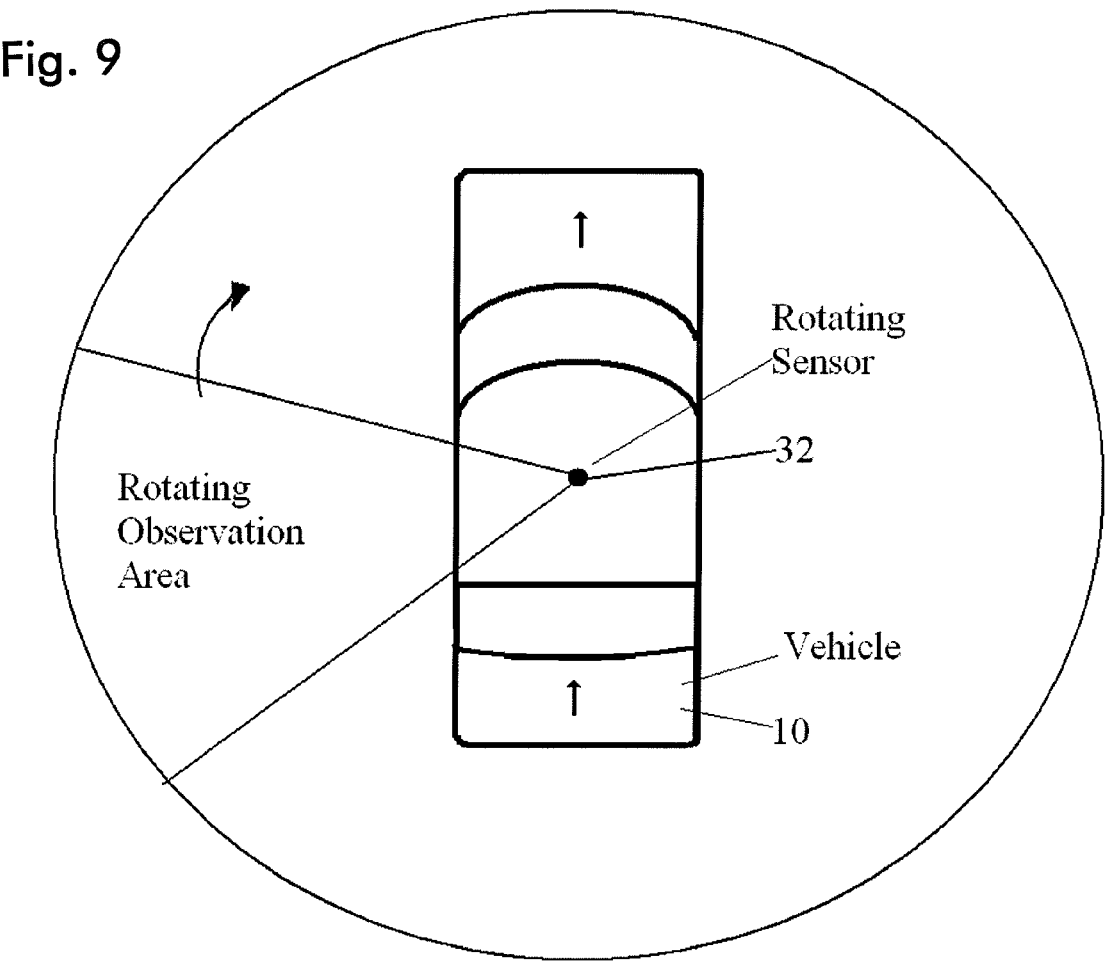
FIG. 9 illustrates a top plan view of a vehicle equipped with a system that includes a 360-degree rotating sensor according to an embodiment of the present invention.

Referring to FIG. 9, according to an aspect of the present invention, instead of (or in addition to) a plurality of sensors as is known in the art, a rotating sensor 32 capable of rotating 360 degrees can be mounted on the roof of vehicle 10 to continuously scan all areas surrounding the moving vehicle 10 to gather information that may indicate to the system that a collision is possible. Rotating sensor 32 can also be locked in one position when more rapid and specific collision information is required. A suitable sensor for sensor 32 may be a radar-based sensor.

A system as described above would be best suited for a vehicle having an automatic transmission. A vehicle with a manual transmission could be fitted with a solenoid to automatically disengage the clutch and a solenoid to shift the vehicle into a neutral gear or a reverse gear. An electric vehicle without transmissions can be decelerated and stopped by reversing the electric motor according to existing practice.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for reducing energy absorbed by a vehicle in a collision, comprising:
   actively decelerating said vehicle that is moving at a speed in a forward direction based on a determination that a collision with an object is possible if said vehicle continues to move in a forward direction at said speed;
   determining, by a processor, whether a collision with said object is inevitable; and
   terminating, upon determining collision with said object is inevitable, said actively decelerating step before said vehicle reaches said object while said vehicle is moving in said forward direction whereby said vehicle contacts with said object.

2. The method of claim 1, wherein said determining that said collision is inevitable is based on said vehicle's speed and deceleration and said vehicle's distance to said object and a determined time to collision.

3. The method of claim 2, wherein said determining that said collision is inevitable is based also on said object's velocity.

4. The method of claim 1, further comprising engaging said vehicle's brakes, after said vehicle makes contact with said object and recoils to move in a reverse direction generally opposite said forward direction.

5. The method of claim 1, wherein said actively decelerating said vehicle comprises one of engaging said vehicle's brakes, shifting said vehicle's transmission into a lower gear, engaging said vehicle's brakes and also shifting said vehicle's transmission into a lower gear, and shifting said vehicle's transmission into reverse gear.

6. The method of claim 1, further comprising determining whether it is possible to shift said vehicle's transmission into a reverse gear before terminating said actively decelerating step.

7. The method of claim 1, wherein said actively decelerating step is terminated at a distance between said vehicle and said object that is calculated based on deceleration of said vehicle at an instant in time, distance between said vehicle and said object at said instant in time, and an amount of time required to effect said terminating said actively decelerating step.

8. The method of claim 1, wherein said actively decelerating step is terminated at a distance between said vehicle and said object that is calculated based on deceleration of said vehicle at an instant in time, distance between said vehicle and said object at said instant in time, velocity of said object at said instant in time and an amount of time required to effect said terminating said actively decelerating step.

9. A system in a vehicle that includes a sensor system and a processor that includes a programmable computer in communication with said sensor system, said sensor system providing information to said programmable computer about objects outside said vehicle, wherein said programmable computer is configured to perform a method to prevent collision or to minimize the collision based on information provided by said sensor system, said method comprising:
   actively decelerating a vehicle that is moving at a speed in a forward direction based on a determination that a collision with an object is possible if said vehicle continues to move in a forward direction at said speed;
   determining, by a processor, whether a collision with said object is inevitable; and
   terminating, upon determining collision with said object is inevitable, said actively decelerating step before said vehicle reaches said object while moving in said forward direction whereby said vehicle contacts with said object.

10. The system of claim 9, wherein it is determined that said collision is inevitable based on said vehicle's deceleration and said vehicle's distance to said object.

11. The system of claim 9, wherein it is determined that said collision is inevitable based on said vehicle's deceleration, distance between said vehicle and said object, and said object's velocity relative to velocity of said vehicle.

12. The system of claim 9, wherein the computer is further configured to engage said vehicle's brakes, after said vehicle makes contact with said object and recoils to move generally in a reverse direction generally opposite said forward direction.

13. The system of claim 9, wherein said computer is configured such that said actively decelerating said vehicle comprises one of engaging said vehicle's brakes, shifting said vehicle's transmission into a lower gear, and engaging said vehicle's brakes and shifting said vehicle's transmission into a lower gear.

14. The system of claim 9, further comprising said computer is configured for determining whether it is possible to shift said vehicle's transmission into a reverse gear before terminating said actively decelerating step.

15. The system of claim 9, wherein said computer is configured such that said actively decelerating step is terminated at a distance between said vehicle and said object that is calculated based on deceleration of said vehicle at an instant in time, distance between said vehicle and said object at said instant in time, and an amount of time required to effect said terminating said actively decelerating step.

16. The system of claim 9, wherein said computer is configured such that said actively decelerating step is terminated at a distance between said vehicle and said object that is calculated based on deceleration of said vehicle at an instant in time, distance between said vehicle and said object at said instant in time, velocity of said object at said instant in time and an amount of time required to effect said terminating said actively decelerating step.

17. The system of claim 9, wherein said programmable computer is further programmed to receive information from said sensor system regarding an object approaching from a rear of said vehicle, and to shift said vehicle's transmission into neutral before said rear approaching object makes contact with said vehicle.

18. The system of claim 9, wherein said computer is configured such that after terminating said actively decelerating step allowing said vehicle to decelerate naturally while moving in said forward direction.

19. The system of claim 9, wherein said object is either stationary or moving in either the same direction as said vehicle or toward said vehicle.

* * * * *